United States Patent
Liu et al.

(10) Patent No.: US 7,248,319 B2
(45) Date of Patent: Jul. 24, 2007

(54) MULTI-DOMAIN VERTICAL ALIGNMENT LIQUID CRYSTAL DISPLAY PANEL COMPRISING ALTERNATING AND PARALLEL SLITS AND PROTRUSIONS

(75) Inventors: Meng-Chi Liu, Tao-Yuan Hsien (TW); Chung-Ge Lin, Tao-Yuan (TW); Kuang-Shyang Lin, Tao-Yuan Hsien (TW); Fu-Yuan Shiau, Chia-I (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 198 days.

(21) Appl. No.: 10/710,887

(22) Filed: Aug. 10, 2004

(65) Prior Publication Data

US 2005/0231672 A1    Oct. 20, 2005

(30) Foreign Application Priority Data

Apr. 16, 2004   (TW) ............................... 93110689 A

(51) Int. Cl.
*G02F 1/1337*   (2006.01)
*G02F 1/1343*   (2006.01)

(52) U.S. Cl. .............. 349/129; 349/139; 349/143; 349/39

(58) Field of Classification Search ............... 349/129
See application file for complete search history.

(56) References Cited

U.S. PATENT DOCUMENTS

| 5,648,796 A | 7/1997 | Boursier et al. |
|---|---|---|
| 5,990,924 A | 11/1999 | Kido et al. |
| 6,266,118 B1 | 7/2001 | Lee et al. |
| 6,281,958 B1 | 8/2001 | Nakajima |
| 6,341,003 B1 | 1/2002 | Ashizawa et al. |
| 6,417,900 B1 | 7/2002 | Shin et al. |
| 6,449,025 B2 | 9/2002 | Lee |
| 6,462,798 B1 * | 10/2002 | Kim et al. ................. 349/129 |
| 6,525,794 B1 | 2/2003 | Kim et al. |
| 2002/0015126 A1 * | 2/2002 | Tsuda et al. ............... 349/129 |
| 2002/0024618 A1 | 2/2002 | Imai |
| 2004/0041976 A1 * | 3/2004 | Kida et al. ................. 349/187 |
| 2004/0095538 A1 * | 5/2004 | Kim et al. ................. 349/129 |

FOREIGN PATENT DOCUMENTS

| JP | 7-181451 | 7/1995 |
|---|---|---|
| JP | 9-230310 | 9/1997 |

(Continued)

*Primary Examiner*—Andrew Schechter
*Assistant Examiner*—W. Patty Chen
(74) *Attorney, Agent, or Firm*—Winston Hsu

(57) ABSTRACT

A multi-domain vertical alignment liquid crystal display (MVA LCD) panel has a bottom substrate, a top substrate parallel to the bottom substrate, and a liquid crystal molecule layer filled in between. The panel further has a plurality of pixel regions arranged in arrays on the bottom substrate, a plurality of common lines traversing the pixel regions, a plurality of pixel electrodes positioned in each pixel region above the common lines, a plurality of slits positioned on each pixel electrode, a common electrode layer positioned on the surface of the top substrate, and a plurality of protrusions arranged parallel to and alternatively with the slits and positioned on the surface of the common electrode layer. The protrusions and the common lines are partially overlapped.

30 Claims, 9 Drawing Sheets

FOREIGN PATENT DOCUMENTS

| | | |
|---|---|---|
| JP | 10-119343 | 5/1998 |
| JP | 11-234539 | 8/1999 |
| JP | P2000-131717 A | 5/2000 |
| JP | P2001-296523 A | 10/2001 |
| JP | P2002-72980 A | 3/2002 |
| JP | P2002-526816 A | 8/2002 |

* cited by examiner

MULTI-DOMAIN VERTICAL ALIGNMENT LIQUID CRYSTAL DISPLAY PANEL COMPRISING ALTERNATING AND PARALLEL SLITS AND PROTRUSIONS

BACKGROUND OF INVENTION

1. Field of the Invention

The present invention relates to a multi-domain vertical alignment (MVA) LCD panel, and more particularly, to an MVA LCD panel having a high aperture ratio without suffering from the light leakage problem due to protrusions.

2. Description of the Prior Art

LCDs have been widely applied to various electronic devices, such as mobile phones, personal digital assistants, and notebook computers in recent years. With the rapid development of the large-size flat display market, LCDs have played an important role and have gradually replaced CRT displays. However, conventional LCDs are limited by their narrow view angles. Consequently, MVA LCD panels which can be viewed in wide angles are therefore designed.

Please refer to FIG. 1 and FIG. 2. FIG. 1 is a schematic diagram of a conventional MVA LCD panel 10 while no voltage is applied; FIG. 2 is a schematic diagram of the conventional MVA LCD panel 10 shown in FIG. 1 while a voltage is applied. As shown in FIG. 1, the conventional MVA LCD panel 10 includes a top substrate 12, a bottom substrate 14, a liquid crystal layer 16 filled in between the top substrate 12 and the bottom substrate 14, a color filter layer 18 positioned on the surface of the top substrate 12 facing the bottom substrate 14, a common electrode layer 20 positioned on the bottom surface of the color filter layer 18, a pixel electrode 15 positioned on the surface of the bottom substrate 14 facing the top substrate 12, at least a first protrusion 22 positioned on the bottom surface of the common electrode layer 20, and at least a second protrusion 24 positioned on the surface of the pixel electrode 15. It is noted that FIG. 1 and FIG. 2 illustrate only a single pixel region of the MVA LCD panel 10, and therefore data lines, scan lines, and thin film transistors (TFTs) are omitted for easy illustration.

While a voltage is applied to the pixel electrode 15, liquid crystal molecules are inclined so that light beams passing through the liquid crystal molecules are rotated. The rotated light beams will pass through the color filter layer 18, and therefore viewers can see brilliant colors. As shown in FIG. 2, the liquid crystal molecules are influenced by the first protrusion 22 and the second protrusion 24, and thus are inclined in different directions. This characteristic makes it possible for the conventional MVA LCD panel 10 to be viewed in wide angles.

As shown in FIG. 1, however, the liquid crystal molecules close to the first protrusion 22 and the second protrusion 24 are slightly inclined under the effect of the first protrusion 22 and the second protrusion 24 even when no voltage is applied. This leads to light leakages and color aberrations, and therefore reduces the contrast ratio of the MVA LCD panel 10. For example, when a complete black state for a pixel region is required, the sub pixels red, green, and blue are supposed to be completely dark. As long as light leakages occur, the completely black state cannot be achieved, and this reduces the contrast ratio. Additionally, if a color mixed only by red and green is required in a pixel region, the light leakage of sub pixel blue would cause the color aberration and deteriorate the display effect.

Currently, a black matrix layer is introduced between the top substrate 12 and the first protrusion 22 to solve the aforementioned light leakage problem. However, the black matrix layer solves the light leakage problems at the cost of low aperture ratio, which is not desired.

SUMMARY OF INVENTION

It is therefore a primary objective of the present invention to provide an MVA LCD panel which utilizes common lines to cover the light leakages close to the protrusions.

It is another objective of the present invention to provide an MVA LCD panel including a plurality of common lines which function as the storage capacitors and the dummy data lines.

In the claimed invention, an MVA LCD panel is disclosed. The MVA LCD panel includes a plurality of data lines, a top substrate and a bottom substrate in parallel with each other. The bottom substrate includes a plurality of pixel regions thereon. The MVA LCD panel further includes a plurality of electrode patterns on a surface of the bottom substrate facing the top substrate. Each electrode pattern further comprises a first electrode pattern parallel to the data line and two second electrode patterns perpendicular to the first electrode pattern. The MVA LCD panel further includes a plurality of pixel electrode respectively positioned in each pixel region and above the electrode patterns, a liquid crystal layer filled between the top substrate and the bottom substrate, a common electrode layer positioned on a surface of the top substrate facing the bottom substrate, and a plurality of protrusions on a surface of the common electrode layer. Each electrode pattern passes through corresponding pixel regions, and each pixel electrode includes a plurality of slits. In addition, each protrusion is arranged parallel to and alternatively with each slit, and the protrusions in the pixel region are positioned above the first electrode pattern in each pixel region.

These and other objectives of the present invention will no doubt become obvious to those of ordinary skill in the art after having read the following detailed description of the preferred embodiment that is illustrated in the various figures and drawings.

DETAILED DESCRIPTION

Figure 1:
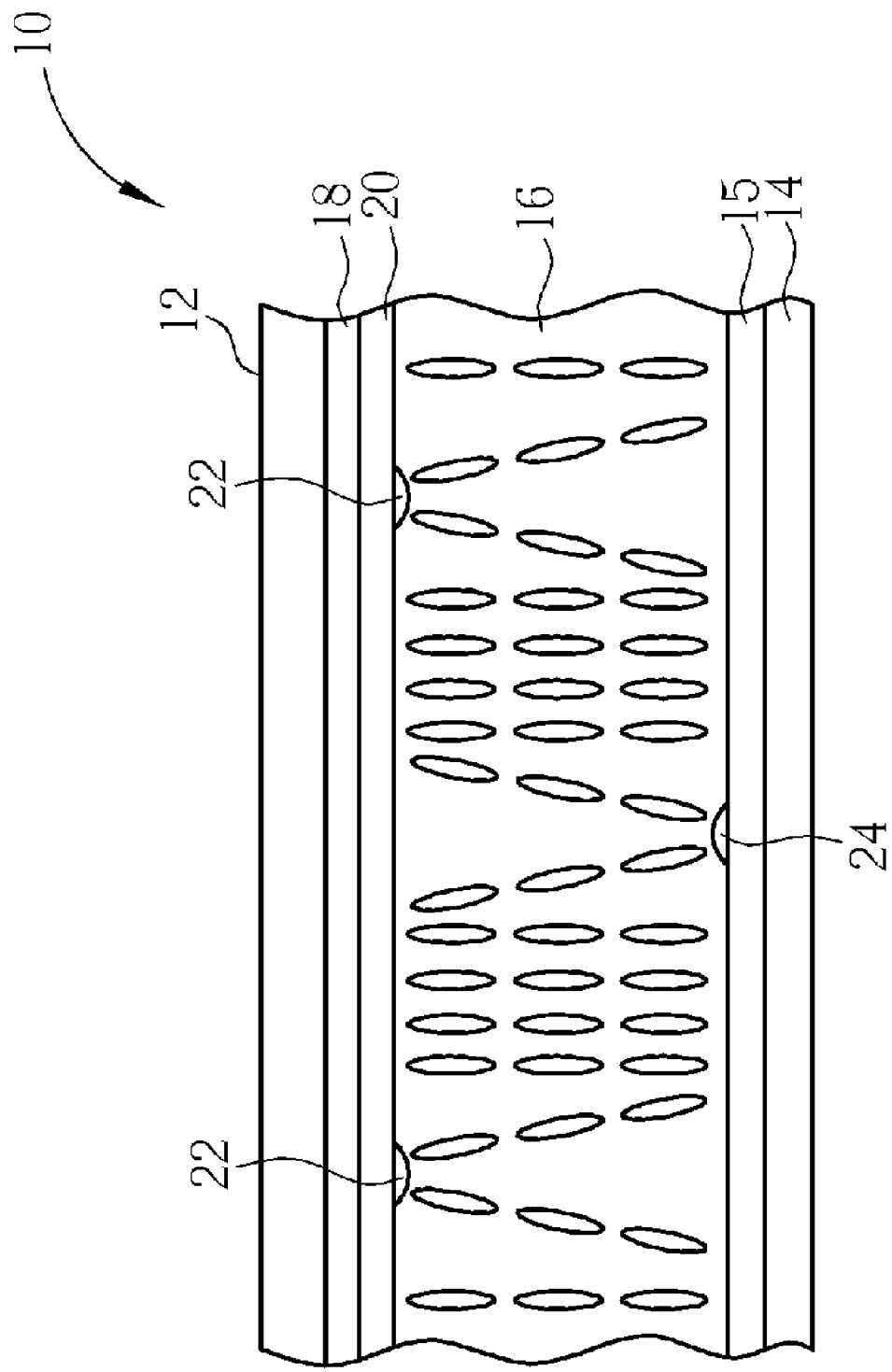
FIG. 1 is a schematic diagram of a conventional MVA LCD panel while no voltage is supplied.
Figure 2:
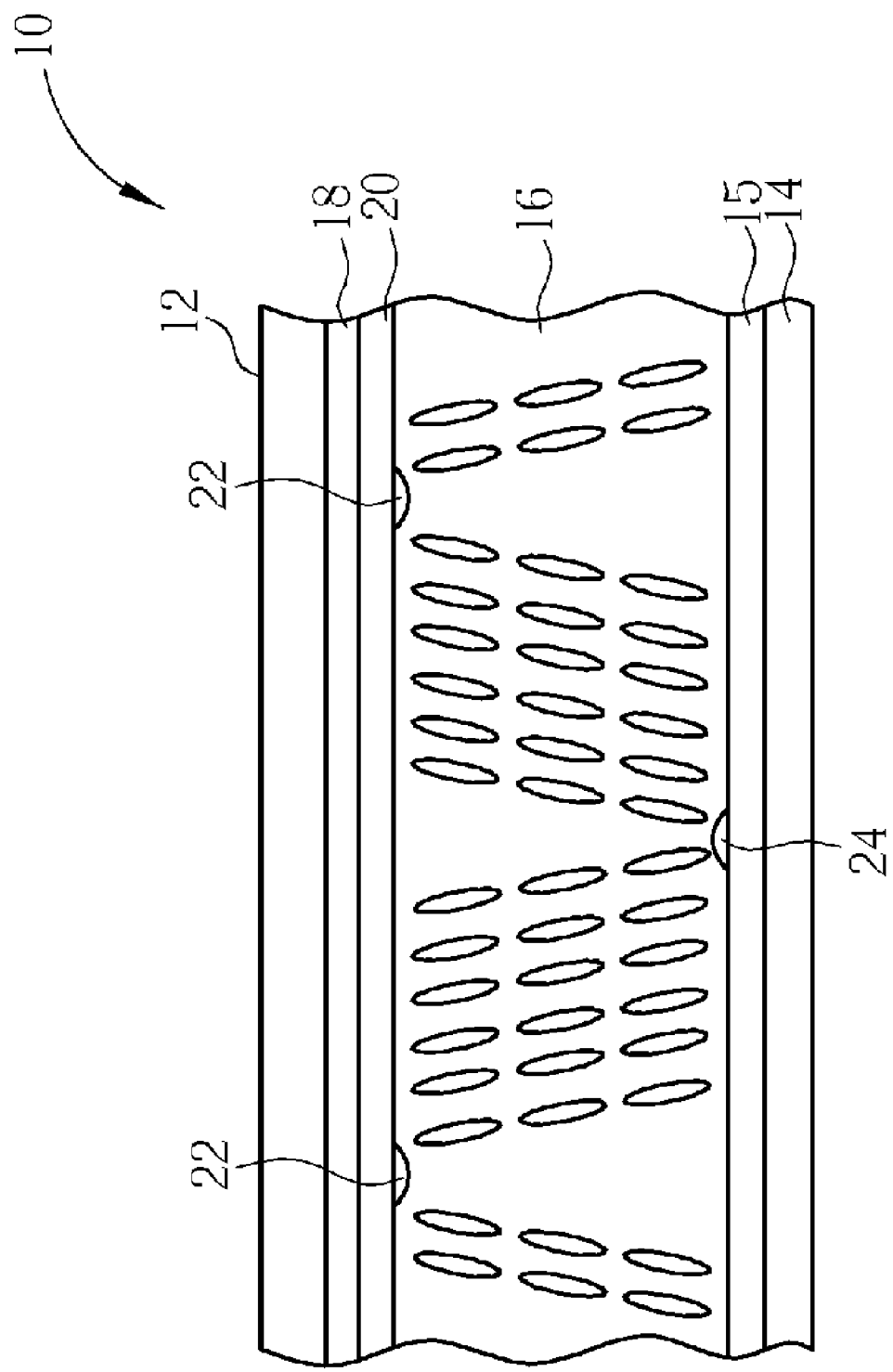
FIG. 2 is a schematic diagram of the conventional MVA LCD panel shown in FIG. 1 while a voltage is applied.
Figure 3:
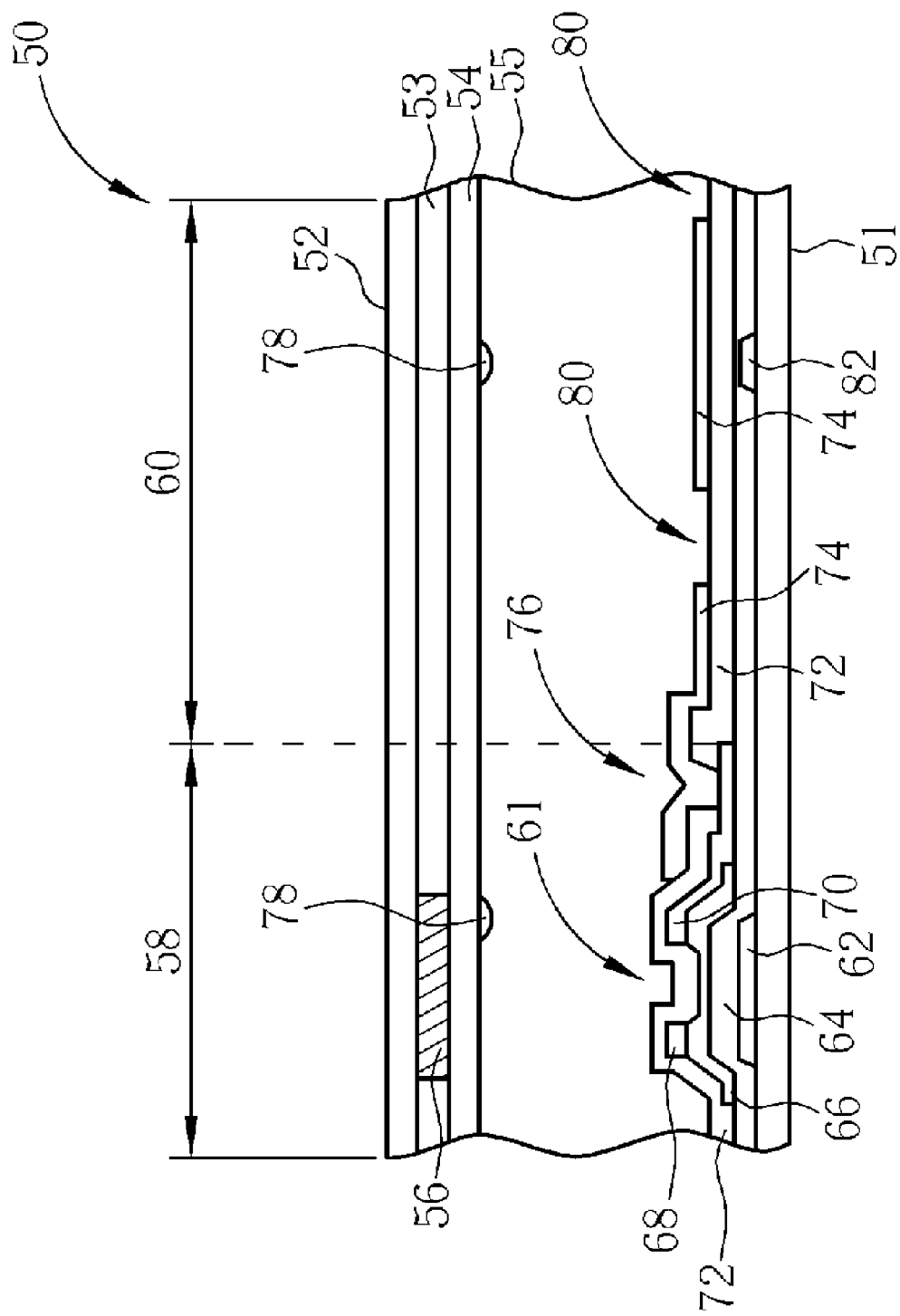
FIG. 3 is a schematic diagram of an MVA LCD panel of the present invention.

Please refer to FIG. 3, which is a schematic diagram of an MVA LCD panel 50 of the present invention. It is noted that only a single pixel is drawn for easy illustration. As shown in FIG. 3, the MVA LCD panel 50 includes a bottom substrate 51, a top substrate 52 parallel to and directly above the bottom substrate 51, a color filter layer 53 positioned on the surface of the top substrate 52 facing the bottom substrate 51, a common electrode layer 54 positioned on a bottom surface of the color filter layer 53, and a liquid crystal layer 55 filled in between the common electrode layer 54 and the bottom substrate 51.

The MVA LCD panel 50 further includes a TFT region 58 and a pixel region 60. The TFT region 58 includes a TFT 61, which functions as a switch and cooperates with a data line (not shown) to provide a voltage to the pixel region 60, and a black matrix layer 56 positioned in between the top substrate 52 and the common electrode layer 54 to prevent light interferences between adjacent pixel regions. The TFT 61 includes a gate 62, a gate insulating layer 64, a semiconductor layer 66, a source 68, a drain 70, a passivation layer 72, and a transparent conductive layer 74. The transparent conductive layer 74 serves as the pixel electrode of the pixel region 60, and is electrically connected to the drain 70 via a contact hole 76 to receive the voltage delivered from the drain 70.

As shown in FIG. 3, the MVA LCD panel 50 further includes a plurality of protrusions 78 positioned on a bottom surface of the common electrode layer 54, and a plurality of slits 80, arranged parallel to and alternatively with the protrusions 78, on the transparent conductive layer 74 of the pixel region 60. This arrangement of the protrusions 78 and the slits 80 aims at driving the liquid crystal molecules to incline in different directions so as to achieve the multi-domain alignment effect.

As described, the liquid crystal molecules close to the protrusions 78 are slightly inclined while no voltage is applied, which leads to light leakage problems. Consequently, the MVA LCD panel 50 includes a plurality of common lines (electrode patterns) 82 positioned on the bottom substrate 51 in the pixel region 60. Since the common lines 82 and the protrusions 78 in the pixel region 60 are partially overlapped, the light leakage in the edge of the protrusions 78 is covered. In addition, the dimensions of the common lines 82 are adjustable in accordance with practical effect. It is worth noting that the common lines 82 also function as electrodes of storage capacitors, and are simultaneously formed on the bottom substrate 51 with the gate 62 and all scan lines (not shown), thus the complexity of processes is not increased. Furthermore, the common lines 82 can be electrically connected together according to different circuit design considerations for improving the effect of the storage capacitor.

Figure 4:
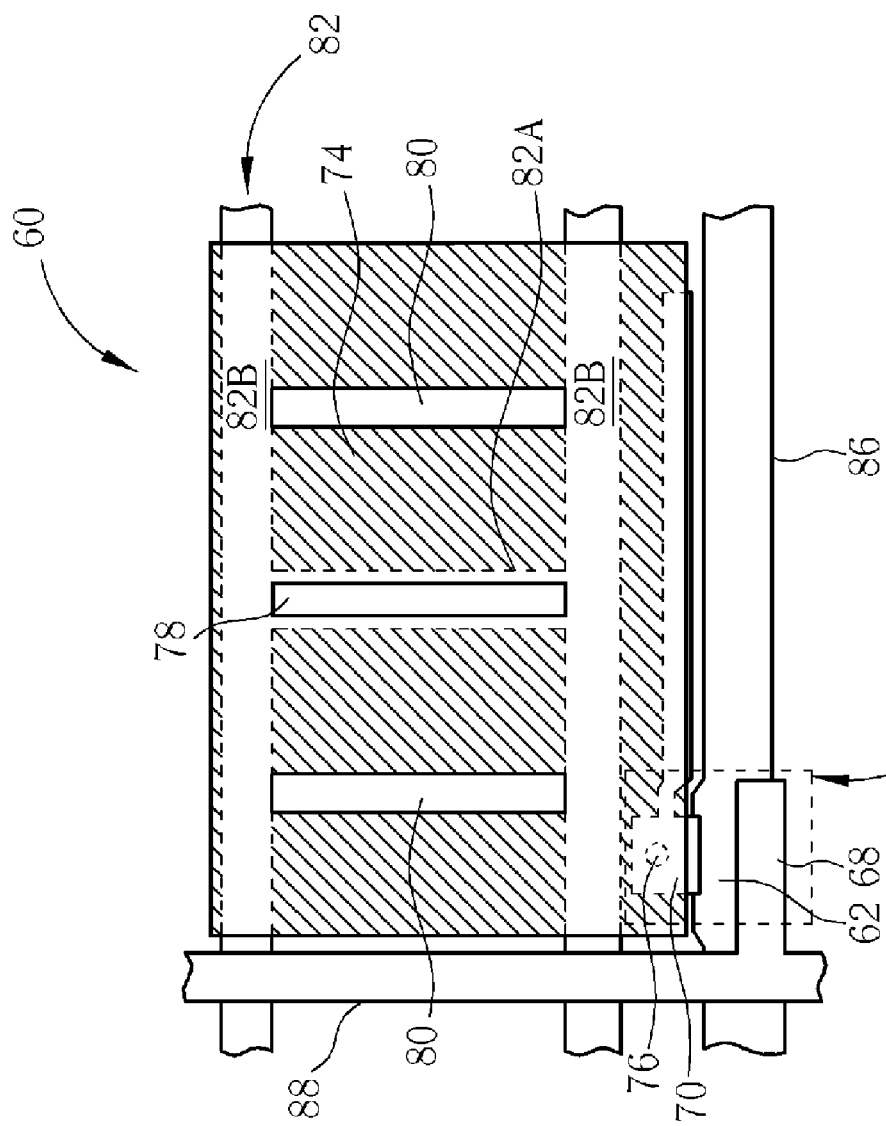
FIG. 4 is a top view of an MVA LCD panel according to a preferred embodiment of the present invention.

For clearly illustrating the arrangement of the common lines 82, please refer to FIG. 4. FIG. 4 is a top view of the MVA LCD panel 50 according to a preferred embodiment of the present invention. As shown in FIG. 4, the gate 62 of the TFT 61 is formed above a scan line 86, and the TFT 64 is controlled by the scan line 86. The source 68 is electrically connected to a data line 88, and the drain is electrically connected to the transparent conductive layer 74, which serves as the pixel electrode, via the contact hole 76. While the gate 62 is turned on by a voltage, the voltage signal carried by the data line 88 will pass through the source 68 and the drain 70, and reach the transparent conductive layer 74 so as to drive the liquid crystal molecules of the pixel region 60 incline. In addition, as shown in FIG. 3 and FIG. 4 the protrusions 78 and the slits 80 are arranged parallel to and alternatively with each other. Also, each common line 82 has an I-shaped structure, and includes a first electrode pattern 82A and two second electrode patterns 82B perpendicular to the first electrode pattern 82A in this preferred embodiment. The first electrode pattern 82A and the protrusion 78 are overlapped, and the dimensions of the first electrode pattern 82A are slightly larger than those of the protrusion 78. Consequently, the light leakage close to the protrusion 78 is effectively covered. The second electrode patterns 82B extend latitudinally through pixel regions in the same row so as to receive a common voltage.

Figure 5:
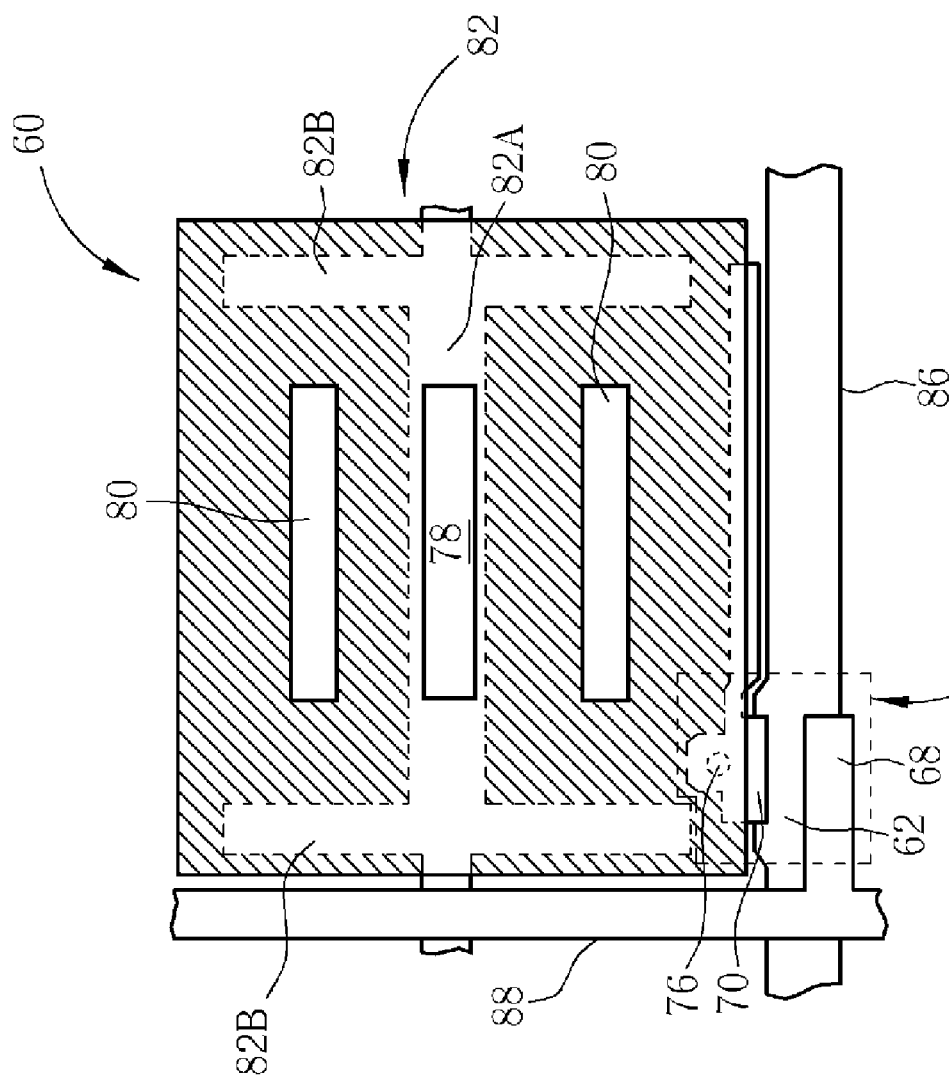
FIG. 5 is a bottom view of the MVA LCD panel according to another preferred embodiment of the present invention.

Please refer to FIG. 5, which is a bottom view of the MVA LCD panel 50 according to another preferred embodiment of the present invention. As shown in FIG. 5, the arrangement of the TFT 61 and the pixel region 60 are similar to that shown in FIG. 4. The difference lies in the directions of the protrusions 78 and the slits 80. In this embodiment, each common line 82 has an H-shaped structure, and includes a first electrode pattern 82A and two second electrode patterns 82B. The first electrode pattern 82A and the protrusion 78 are overlapped, and the dimensions of the first electrode pattern 82A are slightly larger than those of the protrusion 78. Consequently, the light leakage close to the protrusion 78 is effectively covered. In addition, the first electrode pattern 82A extends latitudinally through the pixel regions in the same row for receiving a common voltage.

In addition to covering the light leakage and serving as the storage capacitor, the common lines 82 further function as dummy circuits of the data lines 88 while the data lines 88 are disconnected.

Figure 6:
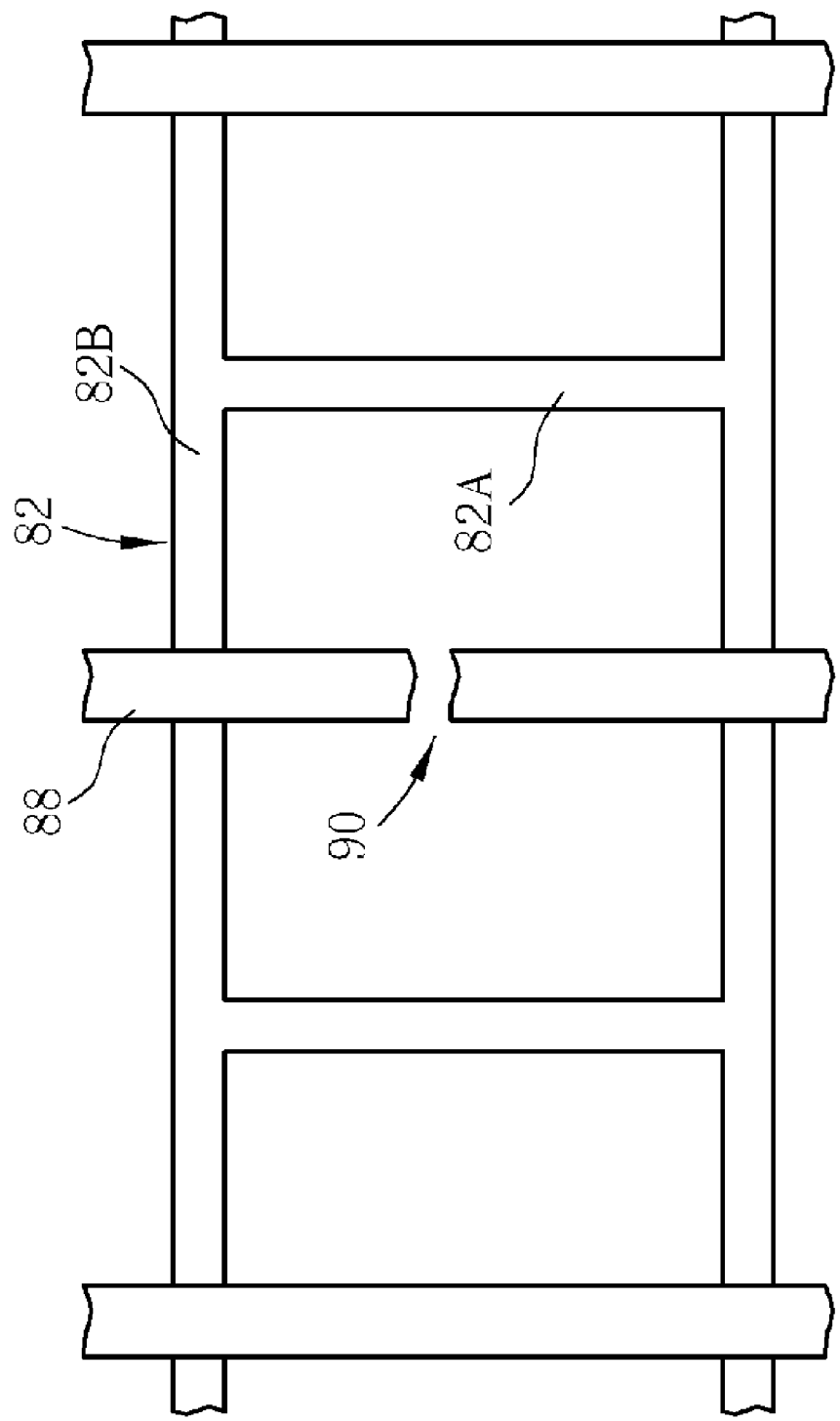
FIG. 6 and FIG. 7 are schematic diagrams illustrating the common lines functioning as dummy circuits according to an embodiment of the present invention.
Figure 7:
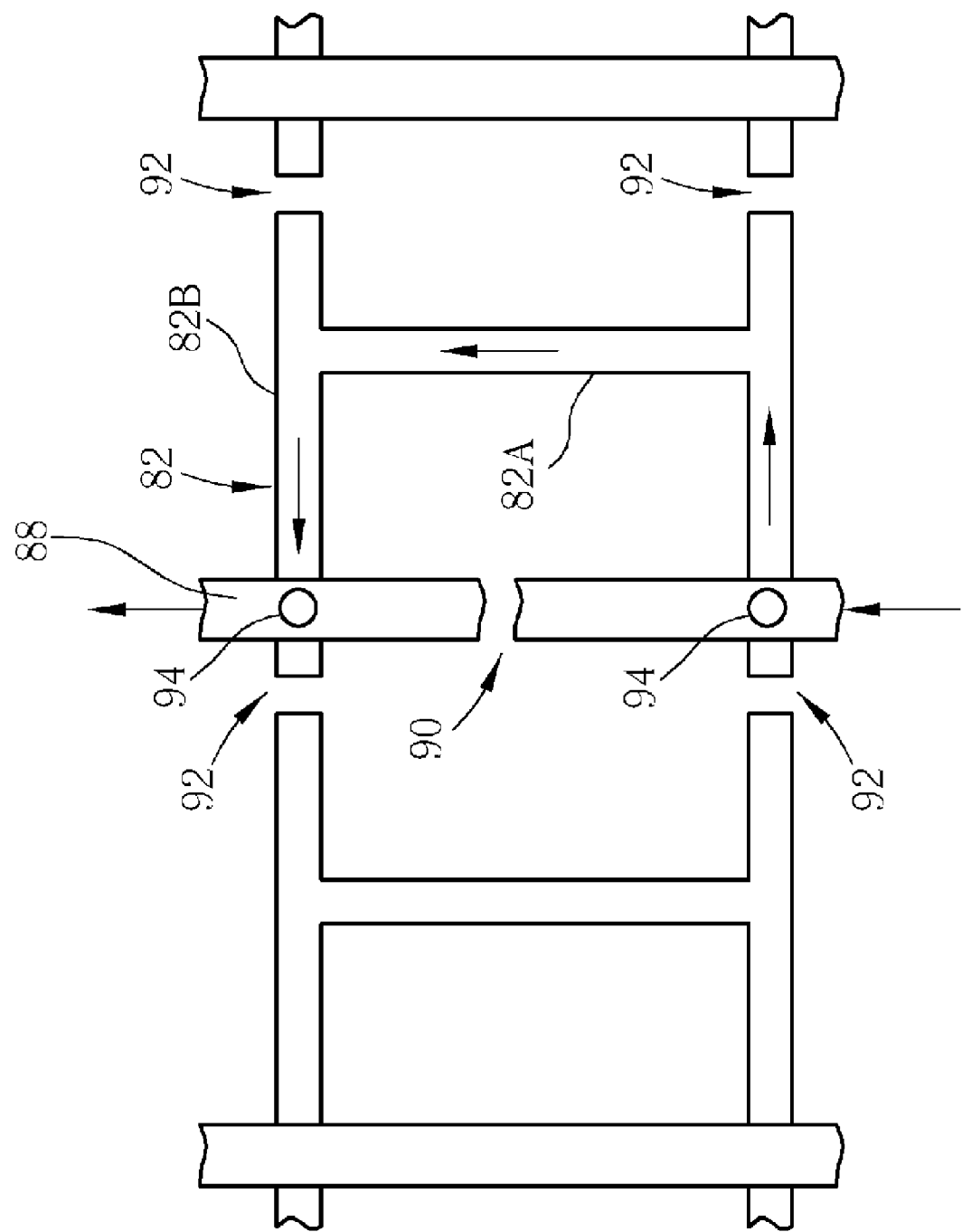

Please refer to FIG. 6 and FIG. 7, which are schematic diagrams illustrating the common lines 82 functioning as dummy circuits according to an embodiment of the present invention. As shown in FIG. 6, the common lines 82 in each pixel region 60 have an I-shaped structure, and are electrically connected together. In addition, the first electrode pattern 82A of each common line 82 is arranged parallel to and alternatively with the data line 88. While the data line 88 is disconnected unexpectedly, the common lines 82 serve as the dummy circuits to replace the data line 88. As shown in FIG. 7, once a defect 90 appears, the second electrode patterns 82A are cut apart (as disconnection parts 92 shown in FIG. 7). After that, two shorting points 94 are formed in the intersections of the data line 88 and the second electrode patterns 82B by laser irradiation, so that the data lines 88 and the second electrode patterns 82B are electrically connected. Accordingly, the voltage signal (expressed as arrows shown in FIG. 7) is delivered to each pixel via the common lines 82.

Figure 8:
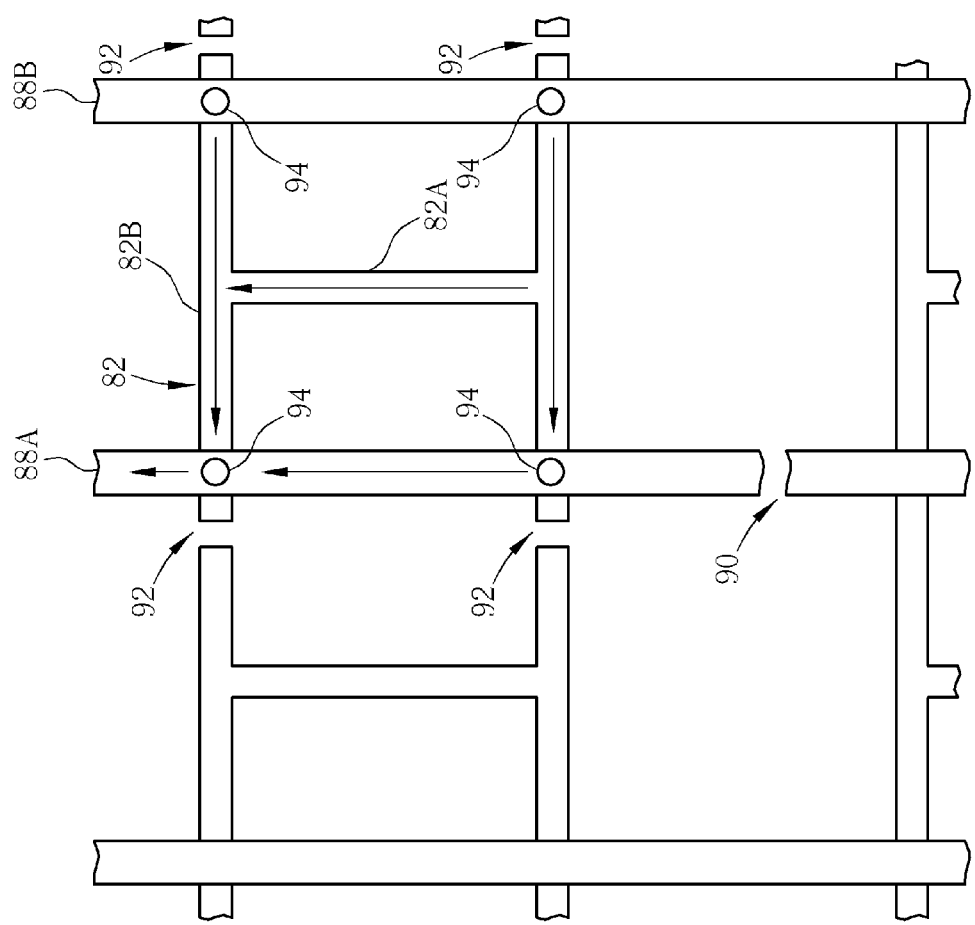
FIG. 8 is a schematic diagram illustrating the common lines functioning as dummy circuits according to another embodiment of the present invention.

Please refer to FIG. 8, which is a schematic diagram illustrating the common lines 82 functioning as dummy circuits according to another embodiment of the present invention. As shown in FIG. 8, if the defect 90 appears in the data line 88A outside of a pixel region, the second electrode patterns 82B are cut apart (as the disconnection parts 92 shown in FIG. 8). Then four shorting points 94 are formed in the intersections of the data lines 88A, 88B and the second electrode patterns 82B by laser irradiation, so that the data lines 88A, 88B and the second electrode patterns 82B are electrically connected. Accordingly, the voltage signal (expressed as arrows shown in FIG. 8) is delivered to each pixel via the common lines 82.

Figure 9:
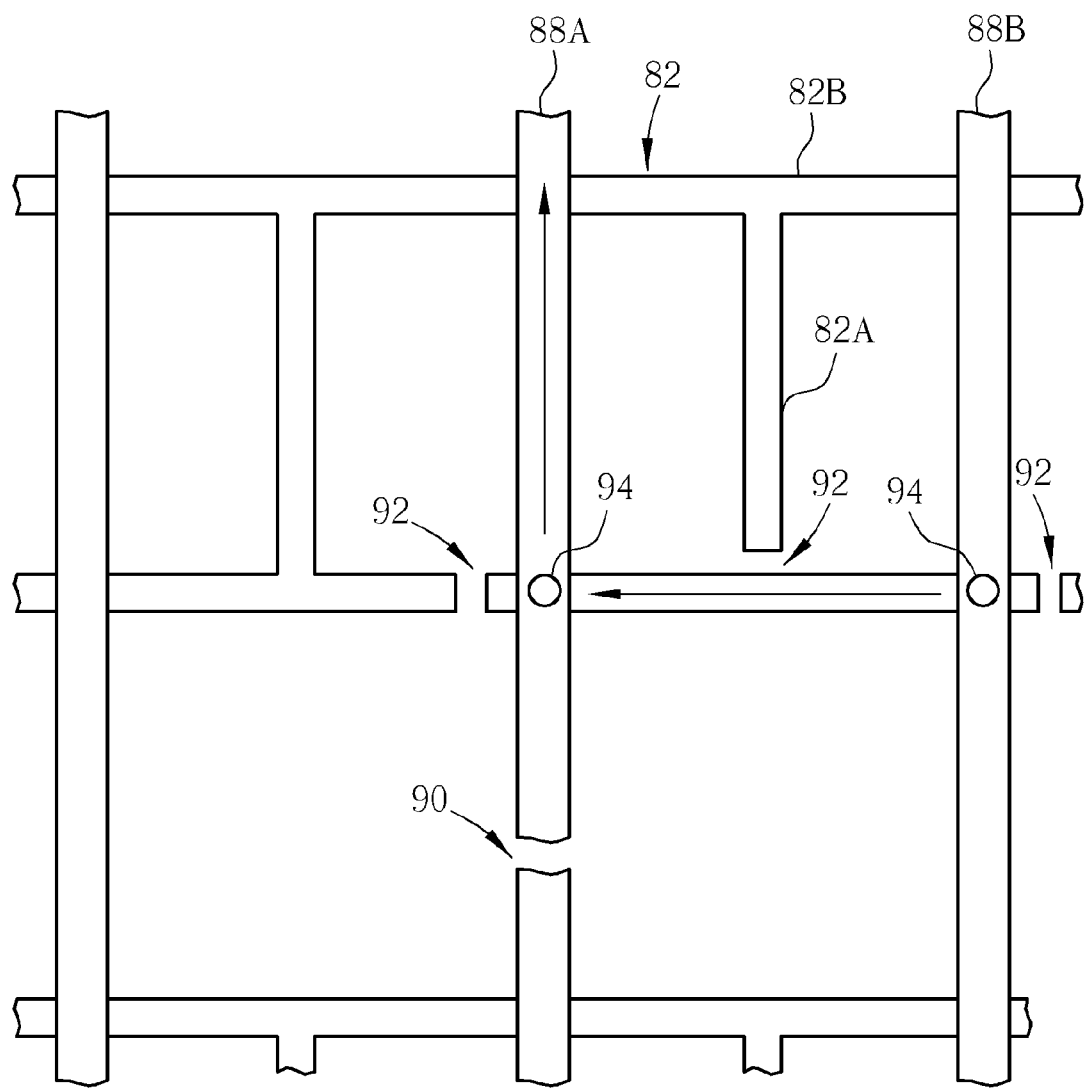
FIG. 9 is a schematic diagram illustrating the common lines functioning as dummy circuits according to still another embodiment of the present invention.

Please refer to FIG. 9, which is a schematic diagram illustrating the common lines 82 functioning as dummy circuits according to still another embodiment of the present invention. As shown in FIG. 9, if the defect 90 appears in the data line 88A outside of a pixel region, the first electrode pattern 82A and the second electrode patterns 82B are cut apart (as the disconnection parts 92 shown in FIG. 9). Then two shorting points 94 are respectively formed in the intersection of the data lines 88A, 88B and the second electrode pattern 82B by laser irradiation, so that the data lines 88A, 88B and the second electrode pattern 82B are electrically connected. Accordingly, the voltage signal (expressed as arrows shown in FIG. 9) is delivered to each pixel via the common lines 82.

In summary, the common lines function as light shielding layers and storage capacitors as well, thus the aperture ratio is improved. In addition, the common lines can be used to repair the data lines by applying laser repair technology as long as defects appear in the data lines.

In comparison with the prior art, the black matrix layer of the present invention is positioned in areas outside of each pixel region, and the light leakages close to the protrusions are covered by the common lines positioned under the protrusions. Consequently, the aperture ratio is not affected. In addition, the common lines also function as the electrodes of storage capacitors, and the dummy circuits of the data lines as well.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A multi-domain vertical alignment (MVA) LCD panel, comprising:
    a first substrate having a plurality of pixel regions arranged in arrays;
    a second substrate positioned parallel to and directly above the first substrate;
    a plurality of conductive lines positioned in each pixel region respectively;
    a plurality of electrode patterns respectively positioned in each pixel region, each electrode pattern comprising a first electrode pattern, parallel to each conductive line, traversing a middle of each pixel region, and two second electrode patterns perpendicular to the first electrode pattern;
    a plurality of pixel electrodes respectively positioned in each pixel region and above the electrode patterns, each pixel electrode comprising a plurality of slits which are parallel to the first electrode pattern;
    a dielectric layer positioned between the electrode patterns and the pixel electrodes;
    a liquid crystal layer positioned between the first substrate and the second substrate;
    a common electrode layer positioned on a surface of the second substrate facing the first substrate; and
    a plurality of protrusions positioned on a surface of the common electrode layer, each protrusion being arranged parallel to and alternately with each slit, wherein the protrusion in each pixel region is positioned above the first electrode pattern.

2. The multi-domain vertical alignment LCD panel of claim 1, wherein the conductive lines are data lines.

3. The multi-domain vertical alignment LCD panel of claim 1, wherein the conductive lines are scan lines.

4. The multi-domain vertical alignment LCD panel of claim 1 further comprising a color filter layer positioned between the second substrate and the common electrode layer.

5. The multi-domain vertical alignment LCD panel of claim 1 further comprising a black matrix layer positioned on the surface of the second substrate facing the first substrate, and corresponding to areas outside of each pixel region of the first substrate.

6. The multi-domain vertical alignment LCD panel of claim 1, wherein the electrode patterns are electrodes of storage capacitors.

7. The multi-domain vertical alignment LCD panel of claim 1 further comprising a plurality of thin film transistors (TFTs) positioned in each pixel region.

8. The multi-domain vertical alignment LCD panel of claim 7, wherein each data line is electrically connected to a source of each thin film transistor.

9. The multi-domain vertical alignment LCD panel of claim 8, wherein the electrode patterns serve as dummy circuits while the data lines are disconnected.

10. The multi-domain vertical alignment LCD panel of claim 1, wherein critical dimensions of the protrusions are less than those of the electrode patterns.

11. The multi-domain vertical alignment LCD panel of claim 1, wherein each electrode pattern in the pixel region is arranged in I-shape.

12. The multi-domain vertical alignment LCD panel of claim 1, wherein each electrode pattern in the pixel region is arranged in H-shape.

13. A multi-domain vertical alignment (MVA) LCD panel, comprising:
    a first substrate having a plurality of pixel regions arranged in arrays;
    a second substrate positioned parallel to and directly above the first substrate;
    a plurality of data lines positioned in each pixel region respectively;
    a plurality of electrode patterns respectively positioned in each pixel region, each electrode pattern comprising a first electrode pattern, parallel to each data line, traversing a middle of each pixel region, and two second electrode patterns perpendicular to the first electrode pattern;
    a plurality of pixel electrodes respectively positioned in each pixel region and above the electrode patterns, each pixel electrode comprising a plurality of slits which are parallel to the first electrode pattern;
    a dielectric layer positioned between the electrode patterns and the pixel electrodes;
    a liquid crystal layer positioned between the first substrate and the second substrate;
    a common electrode layer positioned on a surface of the second substrate facing the first substrate; and
    a plurality of protrusions positioned on a surface of the common electrode layer, each protrusion being arranged parallel to and alternately with each slit, wherein the protrusion in each pixel region is positioned above the first electrode pattern.

14. The multi-domain vertical alignment LCD panel of claim 13 further comprising a color filter layer positioned between the second substrate and the common electrode layer.

15. The multi-domain vertical alignment LCD panel of claim 13 further comprising a black matrix layer positioned on the surface of the second substrate facing the first substrate, and corresponding to areas outside of each pixel region of the first substrate.

16. The multi-domain vertical alignment LCD panel of claim 13, wherein the electrode patterns are electrodes of storage capacitors.

17. The multi-domain vertical alignment LCD panel of claim 10, wherein the electrode patterns are electrically connected to one another.

18. The multi-domain vertical alignment LCD panel of claim 13 further comprising a plurality of thin film transistor (TFTs) respectively positioned in each pixel region, wherein each data line is connected to a source of the TFT.

19. The multi-domain vertical alignment LCD panel of claim 18, wherein the electrode patterns serve as dummy circuits while the data lines are disconnected.

20. The multi-domain vertical alignment LCD panel of claim 13, wherein critical dimensions of the protrusions are less than those of the electrode patterns.

21. The multi-domain vertical alignment LCD panel of claim 13, wherein each electrode pattern in the pixel region is arranged in I-shape.

22. A multi-domain vertical alignment (MVA) LCD panel, comprising:
 a first substrate having a plurality of pixel regions arranged in arrays;
 a second substrate positioned parallel to and directly above the first substrate;
 a plurality of data lines positioned in each pixel region;
 a plurality of electrode patterns positioned in each pixel region, each electrode pattern comprising a first electrode pattern, perpendicular to each data line, traversing a middle of each pixel region, and two second electrode patterns perpendicular to the first electrode pattern;
 a plurality of pixel electrodes positioned in each pixel region and above the electrode patterns, each pixel electrode comprising a plurality of slits which are parallel to the first electrode pattern;
 a dielectric layer positioned between the electrode patterns and the pixel electrodes;
 a liquid crystal layer positioned between the first substrate and the second substrate;
 a common electrode layer positioned on a surface of the second substrate facing the first substrate; and
 a plurality of protrusions positioned on a surface of the common electrode layer, each protrusion being arranged parallel to and alternately with each slit, wherein the protrusions located in the pixel region are positioned above the first electrode pattern respectively.

23. The multi-domain vertical alignment LCD panel of claim 22 further comprising a color filter layer positioned between the second substrate and the common electrode layer.

24. The multi-domain vertical alignment LCD panel of claim 22 further comprising a black matrix layer positioned on the surface of the second substrate facing the first substrate, and corresponding to areas outside of each pixel region of the first substrate.

25. The multi-domain vertical alignment LCD panel of claim 22, wherein the electrode patterns are electrodes of storage capacitors.

26. The multi-domain vertical alignment LCD panel of claim 22 further comprising a plurality of thin film transistors (TFTs) positioned in each pixel region.

27. The multi-domain vertical alignment LCD panel of claim 26, wherein each data line is electrically connected to a source of each thin film transistor.

28. The multi-domain vertical alignment LCD panel of claim 27, wherein the electrode patterns serve as dummy circuits while the data lines are disconnected.

29. The multi-domain vertical alignment LCD panel of claim 22, wherein critical dimensions of the protrusions are less than those of the electrode patterns.

30. The multi-domain vertical alignment LCD panel of claim 22, wherein each electrode pattern in the pixel region is arranged in H-shape.

\* \* \* \* \*

UNITED STATES PATENT AND TRADEMARK OFFICE
CERTIFICATE OF CORRECTION

| | | |
|---|---|---|
| PATENT NO. | : 7,248,319 B2 | Page 1 of 1 |
| APPLICATION NO. | : 10/710887 | |
| DATED | : July 24, 2007 | |
| INVENTOR(S) | : Meng-Chi Liou et al. | |

It is certified that error appears in the above-identified patent and that said Letters Patent is hereby corrected as shown below:

On the Title Page, Item (75), Inventors, the last name of the first named inventor should be corrected from "Liu" to --Liou --

Signed and Sealed this

Sixteenth Day of October, 2007

JON W. DUDAS
*Director of the United States Patent and Trademark Office*